UNITED STATES PATENT OFFICE.

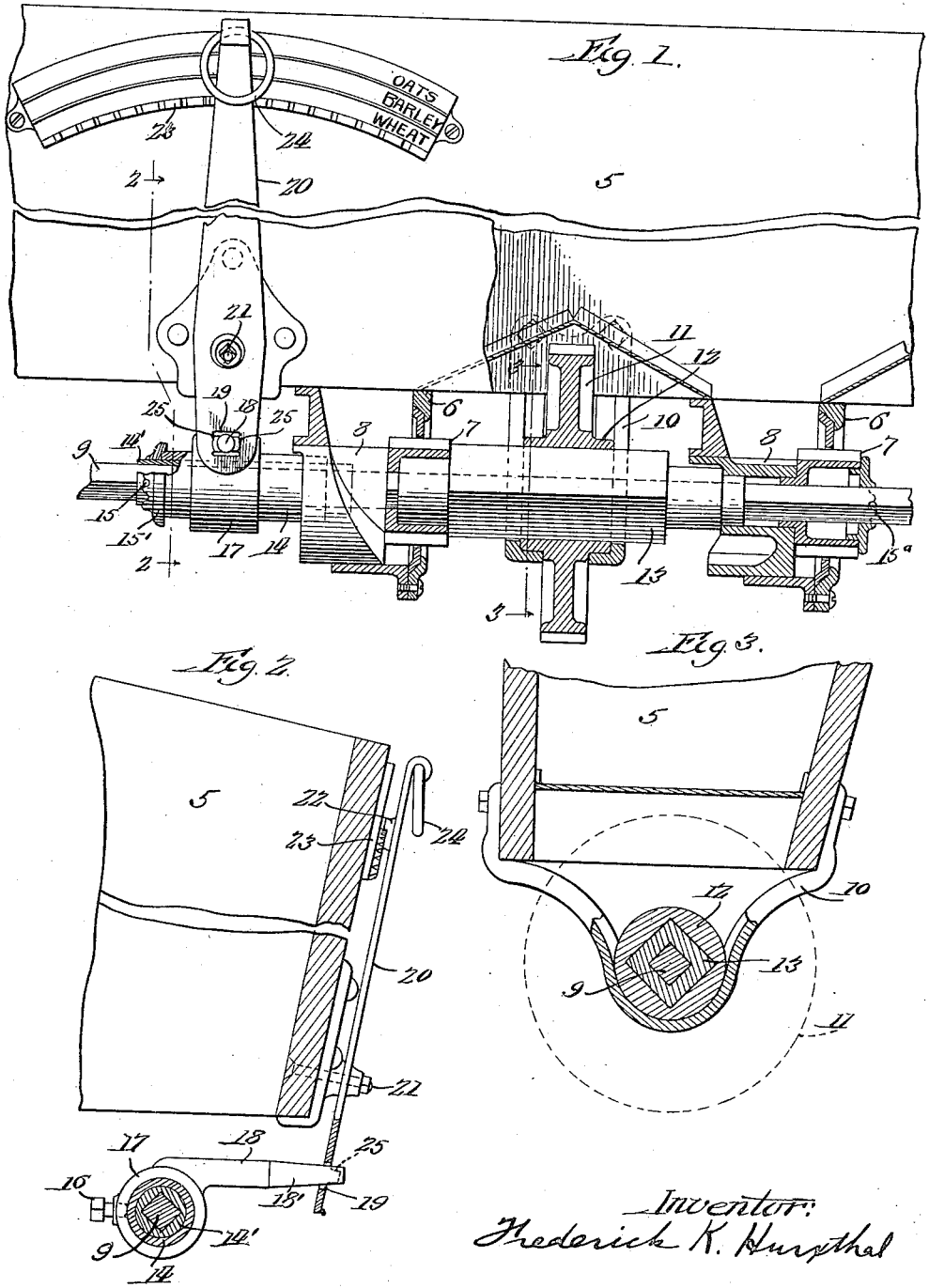

FREDERICK K. HURXTHAL, OF ROCKFORD, ILLINOIS, ASSIGNOR TO EMERSON-BRANTINGHAM COMPANY, OF ROCKFORD, ILLINOIS, A CORPORATION OF ILLINOIS.

GRAIN-DISTRIBUTER.

1,215,809.

Specification of Letters Patent.

Patented Feb. 13, 1917.

Application filed March 2, 1916. Serial No. 81,673.

*To all whom it may concern:*

Be it known that I, FREDERICK K. HURXTHAL, a citizen of the United States, residing at Rockford, in the county of Winnebago and State of Illinois, have invented certain new and useful Improvements in Grain-Distributers, of which the following is a specification.

This invention relates to grain distributers of the type illustrated in Letters Patent to N. L. Heckman, No. 864,739, dated August 27, 1907. In grain distributers of this type, the square feed shaft that extends through the seed cells and carries the fluted seed wheels by which the grain is delivered in regulated quantities from the seed cells has commonly been driven by a gear hubbed directly on the feed shaft and forming a member of a gear train leading from the axle, this gear being confined sidewise so as to not partake of the endwise movement of the feed shaft which regulates the seed wheels relatively to the seed cells. By reason of this construction it has been found that the turning thrust or torque of the gear on the relatively short section of the feed shaft lying within the hub of the gear, twists or warps the feed shaft locally at and adjacent to the hub of the gear thereby interfering with the free endwise movement of the feed shaft when regulating the said wheels, owing to the fact that the gear, when idle, is locked against turning movement by the gear train of which it forms a member. One object of my present invention is to provide an improved driving connection to the feed shaft which shall eliminate this fault.

Another difficulty heretofore experienced in grain distributers of this type has related to the manual means for effecting the endwise shifting of the feed shaft in order to regulate the flow of the grain through the seed cells and wheels. A further object of my invention, therefore, is to provide a simplified and improved feed-shaft shifting device by which the endwise movement of the feed shaft may be effected without lateral strain upon the shaft and the parts in which it is mounted.

With these objects in view, my invention resides in the improved features of construction of a grain distributer hereinafter described, typically illustrated in the drawing, and defined in the appended claims.

The improvements forming the subject matter of my present invention are illustrated, in one practical workable embodiment thereof, in the accompanying drawing forming a part of this specification, wherein—

Figure 1 is a front elevation of a fragmentary portion of the seed hopper showing the seed-distributing mechanism mounted thereon partly in elevation and partly in longitudinal section.

Fig. 2 is a sectional view taken on the line 2—2 of Fig. 1.

Fig. 3 is a sectional view taken on the line 3—3 of Fig. 1.

Referring to the drawing, 5 designates a portion of the feed hopper to which the grain is supplied, and 6 designates a plurality of seed cells mounted on the bottom wall of the hopper and each communicating with the interior of the latter through suitable ports not herein shown but well understood in this art. In one side wall of the seed cell is mounted the fluted seed wheel or roll 7, and through the opposite side wall of the seed cell extends a non-rotating sleeve 8, which moves longitudinally with the seed wheel and is so shaped as to provide a discharge passage from the seed cell to the fluted periphery of the seed wheel, all as fully described and explained in the Heckman patent, herein above referred to. Through the seed cells, wheels, and seed-guiding sleeves extends the feed shaft 9 which is of non-circular cross section, preferably square as shown. Confined against lateral movement by a bracket member 10 secured to the hopper is a gear 11, the hub 12 of which, as shown in Fig. 3, has a square bore, to slidably receive a square sleeve member 13, which latter, in turn, is slidably but non-rotatably mounted on the feed shaft 9. It will be noted that the length of the sleeve 13 is substantially greater than the length of the hub 12 of the gear, whereby the twisting effect transmitted by the gear to the shaft is distributed over such a length of the latter as to produce no local warping of the shaft, so that the latter may be readily moved endwise in adjusting the distributing mechanism of the seed cells. Furthermore, owing to the relatively large diameter of the sleeve 13 (which moves endwise with the shaft 9), local twisting or warping of the sleeve by the hub of the gear is avoided, so that the sleeve slides freely through the gear.

Referring now to the means for effecting the endwise movement of the feed shaft, 14 designates a circular sleeve that is mounted on a bushing 14' on the shaft 9 and held from endwise movement relatively to the latter by a disk 15' and cotter pin 15 at one end and by the engagement of the sleeve at its other end with the seed delivery sleeve 8 of the adjoining seed cell; it here being noted that the members 7 and 8 of the seed cells and the interposed driving sleeve 13 are all contiguous endwise, so that the thrust to the right (Fig. 1) transmitted through the sleeve 13 is received by the shaft 9 through a cotter pin 15ᵃ at the opposite end of the shaft assembly shown in Fig. 1. Surrounding and keyed to the sleeve 14 by a set screw 16, (Fig. 2) is a collar 17, provided with a laterally projecting arm 18 having a tapered forward end 18' that extends through an opening 19 in the lower end of a lever 20, fulcrumed on the front wall of the hopper 5 by a pivot bolt 21 and having at its upper end a tooth 22 coöperating with a segment rack 23. The lever 20 is sufficiently elastic to normally remain engaged with the rack 23, but may be readily withdrawn therefrom and shifted angularly on its pivot by means of a ring 24 or other convenient finger hold on the upper end of the lever. In forming the hole 19 in the lower end of the lever for the reception of the end of the arm 18, the metal is punched out on either side of the hole producing laterally projecting lugs 25 which form bearings of increased thickness for the tapered end 18' of the arm, thereby holding the latter more rigidly and in fixed angular relation to the plane of the lever 20 and reducing the wear that would otherwise occur on the lateral edges of the hole.

It is believed that the nature and advantages of my present invention will be readily understood from the foregoing description and the accompanying illustration; and, therefore, without limiting myself to the precise and exact details shown and described—

I claim:

1. In a grain distributer, the combination of a hopper, a feed shaft of non-circular cross-section journaled on said hopper, a seed-cup through which said shaft extends, a seed wheel on said shaft adjustable by endwise movement of said shaft through a side wall of said seed-cup, and means for rotating said feed shaft comprising a gear, a sleeve member of substantially greater length than the hub of said gear non-rotatably mounted in said gear hub, said sleeve being non-rotatably mounted on said shaft and adjustable endwise therewith, means for shifting said feed shaft endwise, and means confining said gear against sidewise movement when said shaft and sleeve are shifted endwise.

2. In a grain distributer, the combination of a hopper, a feed shaft of polygonal cross-section journaled on said hopper, a seed-cup through which said shaft extends, a seed wheel on said shaft adjustable by endwise movement of said shaft through a side wall of said seed cup, and means for rotating said feed shaft comprising a gear the hub of which has a polygonal bore, a sleeve member of substantially greater length than the hub of said gear slidably fitting in the bore of the latter and non-rotatable on said shaft, means for shifting said feed shaft endwise, and a bracket secured to said hopper and straddling said gear to prevent sidewise movement of the latter under endwise movement of the feed shaft.

3. In a grain distributer, the combination of a hopper, an endwise movable feed shaft mounted on said hopper, and means for shifting said shaft endwise comprising a sleeve mounted on and rotatable relatively to said shaft and confined against endwise movement on the latter, a collar keyed to said sleeve and having a laterally projecting arm, and a lever pivoted to said hopper and at its lower end articulated to the free end of said arm.

4. In a grain distributer, the combination of a hopper, an endwise movable square feed shaft mounted on said hopper, and means for shifting said shaft endwise comprising a bushing mounted on the shaft, a sleeve mounted on the bushing and confined against endwise movement relatively to the latter and said shaft, a collar keyed to said sleeve and having a laterally projecting arm, and a lever pivoted to said hopper and having a depending arm formed with a laterally reinforcing hole through which the end of said arm extends.

5. In a grain distributer, the combination of a hopper, an endwise movable square feed shaft mounted on said hopper, and means for shifting said shaft endwise comprising a bushing fixed to said shaft, a sleeve rotatably mounted on the bushing and confined against endwise movement thereon, said sleeve carrying a laterally projecting arm, and a lever mounted on the hopper and articulated to said arm whereby to shift said shaft endwise.

6. In a grain distributer, the combination of a hopper, an endwise movable feed shaft mounted on the hopper, and means for shifting said shaft endwise comprising a collar mounted on and rotatable relatively to said shaft, confined against endwise movement on the latter and provided with a laterally projecting arm terminating in a tapered end, and a lever pivoted to said hopper and having an opening shaped to receive the tapered end of said arm and to engage only a portion of diametrically opposite sides of the tapered portion thereof.

FREDERICK K. HURXTHAL.

Copies of this patent may be obtained for five cents each, by addressing the "Commissioner of Patents, Washington, D. C."